United States Patent
Murphy

(10) Patent No.: US 11,825,974 B1
(45) Date of Patent: *Nov. 28, 2023

(54) EXPANDABLE STRAINER INSERT FOR BOTTLES

(71) Applicant: Michael O. Murphy, Sour Lake, TX (US)

(72) Inventor: Michael O. Murphy, Sour Lake, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/739,267

(22) Filed: May 9, 2022

Related U.S. Application Data

(63) Continuation-in-part of application No. 16/808,537, filed on Mar. 4, 2020, now Pat. No. 11,452,399.

(60) Provisional application No. 62/983,743, filed on Mar. 1, 2020.

(51) Int. Cl.
*A47J 19/00* (2006.01)
*A23L 2/04* (2006.01)
*B01D 29/33* (2006.01)

(52) U.S. Cl.
CPC .............. *A47J 19/005* (2013.01); *A23L 2/04* (2013.01); *B01D 29/33* (2013.01)

(58) Field of Classification Search
None
See application file for complete search history.

(56) References Cited

U.S. PATENT DOCUMENTS

| | | | | |
|---|---|---|---|---|
| 78,513 A * | 6/1868 | Button | .................... | B67B 7/403 294/100 |
| 120,830 A * | 11/1871 | Simpers | .................. | B67B 7/403 81/3.07 |
| 199,760 A * | 1/1878 | Tyrer1 | .................... | B67B 7/403 81/3.07 |
| 242,962 A * | 6/1881 | Newton | .................. | A47J 31/14 222/189.01 |
| 626,238 A * | 6/1899 | Knapp | .................... | C02F 1/003 222/545 |
| 647,580 A * | 4/1900 | Parker | .................... | A47J 31/14 312/31.1 |
| 690,457 A * | 1/1902 | Parker | .................... | C02F 1/003 210/244 |
| 707,873 A * | 8/1902 | Spencer | ............... | B01D 24/165 222/545 |
| 791,497 A * | 6/1905 | Putnam | .................. | A47L 13/25 294/93 |
| 817,452 A * | 4/1906 | Skinner | .................. | A47J 31/14 210/467 |
| 872,407 A * | 12/1907 | Donahoe | ................. | A47J 31/14 222/484 |
| 920,791 A * | 5/1909 | Tonini | .................. | A61M 5/162 215/308 |

(Continued)

*Primary Examiner* — Robert J Popovics
(74) *Attorney, Agent, or Firm* — John R. Casperson

(57) ABSTRACT

To make a flavored beverage, plant matter is inserted into a bottle through the neck of the bottle. Afterwards, a generally tubular strainer is inserted into the bottle. The tubular strainer has a flange that sealingly abuts against the neck of the bottle. The bottle is filled with a water-based liquid and capped. By inserting the plant matter before the strainer, the plant matter is trapped between the strainer and the bottle wall, making it visible from the outside if the bottle is clear. The strainer prevents the plant matter from being ingested by the user.

12 Claims, 2 Drawing Sheets

(56) References Cited

U.S. PATENT DOCUMENTS

| | | | | |
|---|---|---|---|---|
| 1,115,016 A * | 10/1914 | Pheils | B65F 1/1447 | |
| | | | 193/11 | |
| 1,146,573 A * | 7/1915 | Jacobs | B22D 43/002 | |
| | | | 222/605 | |
| 1,164,453 A * | 12/1915 | Belles | A47J 31/14 | |
| | | | 222/500 | |
| 1,213,319 A * | 1/1917 | Whitaker | B65D 39/16 | |
| | | | 215/364 | |
| 1,281,984 A * | 10/1918 | Long | A47G 19/16 | |
| | | | 99/287 | |
| 1,352,120 A * | 9/1920 | Eleuthere | B01D 35/005 | |
| | | | 210/454 | |
| 1,415,217 A * | 5/1922 | Brock | B60K 15/04 | |
| | | | 210/473 | |
| 1,436,294 A * | 11/1922 | Scott | B60K 15/0406 | |
| | | | 210/473 | |
| 1,488,865 A * | 4/1924 | Castor | B65D 47/06 | |
| | | | 215/307 | |
| 1,581,947 A * | 4/1926 | Hobbs | B01D 35/023 | |
| | | | 210/473 | |
| 1,596,362 A * | 8/1926 | McDonald | B01D 35/023 | |
| | | | 210/305 | |
| 1,604,048 A * | 10/1926 | Hobbs | B01D 35/023 | |
| | | | 210/172.6 | |
| 1,644,121 A * | 10/1927 | Greene | F04B 53/1037 | |
| | | | 209/400 | |
| 1,677,118 A * | 7/1928 | Ford | B01D 29/23 | |
| | | | 210/473 | |
| 1,814,656 A * | 7/1931 | Anschicks | B65D 25/385 | |
| | | | 210/172.6 | |
| 1,961,498 A * | 6/1934 | Krueger | B01D 35/02 | |
| | | | 210/497.3 | |
| 1,976,975 A * | 10/1934 | Williams | B60K 15/0406 | |
| | | | 220/86.3 | |
| 2,010,445 A * | 8/1935 | Sparks | B60K 15/04 | |
| | | | 220/86.3 | |
| 2,019,094 A * | 10/1935 | Rice | B01D 35/02 | |
| | | | 210/497.3 | |
| 2,052,941 A * | 9/1936 | Prevost | A01J 11/12 | |
| | | | 215/363 | |
| 2,055,096 A * | 9/1936 | Dehn | C02F 1/003 | |
| | | | 222/548 | |
| 2,086,073 A * | 7/1937 | Francescon | C12G 3/07 | |
| | | | 99/277.1 | |
| 2,093,980 A * | 9/1937 | Linger | A47G 19/14 | |
| | | | 99/322 | |
| 2,145,759 A * | 1/1939 | Fellows | B60K 15/0406 | |
| | | | 210/172.6 | |
| 2,172,031 A * | 9/1939 | Norman | C02F 1/003 | |
| | | | 210/473 | |
| 2,207,294 A * | 7/1940 | Hubner | B05B 11/047 | |
| | | | 264/296 | |
| 2,212,318 A * | 8/1940 | Gee | A61M 5/1417 | |
| | | | 210/493.1 | |
| 2,222,511 A * | 11/1940 | McAlister | A01J 11/12 | |
| | | | 210/514 | |
| 2,275,318 A * | 3/1942 | Rasmussen | B65D 47/249 | |
| | | | 222/487 | |
| 2,288,532 A * | 6/1942 | Knapp | F16L 55/24 | |
| | | | 210/474 | |
| 2,335,195 A * | 11/1943 | Packer | B65D 47/0876 | |
| | | | 222/469 | |
| 2,370,668 A * | 3/1945 | Johnson | B65D 25/48 | |
| | | | 222/542 | |
| 2,389,185 A * | 11/1945 | Dick | A45F 3/16 | |
| | | | 210/489 | |
| 2,418,630 A * | 4/1947 | Febbraro | B65D 51/24 | |
| | | | 215/316 | |
| 2,491,796 A * | 12/1949 | Baume | F16L 55/24 | |
| | | | 210/497.3 | |
| 2,505,305 A * | 4/1950 | Schaefer | E03C 1/264 | |
| | | | 4/289 | |
| 2,524,313 A * | 10/1950 | Gerling | B67D 7/42 | |
| | | | 210/309 | |
| 2,733,775 A * | 2/1956 | Dupure | B01D 35/023 | |
| | | | 210/348 | |
| 2,788,733 A * | 4/1957 | Jacques | A47J 31/0636 | |
| | | | 99/317 | |
| 2,808,775 A * | 10/1957 | Schott | A47J 31/053 | |
| | | | 99/287 | |
| 2,895,357 A * | 7/1959 | Perez | B67B 7/10 | |
| | | | D8/42 | |
| 2,933,188 A * | 4/1960 | Jacula | B01D 35/027 | |
| | | | 210/429 | |
| 3,016,984 A * | 1/1962 | Getzin | B01D 46/24 | |
| | | | 55/501 | |
| 3,102,465 A * | 9/1963 | Montesano | A47G 19/16 | |
| | | | 206/0.5 | |
| 3,220,555 A * | 11/1965 | Silha | B65D 51/24 | |
| | | | 210/469 | |
| 3,322,282 A * | 5/1967 | Lyman | A47L 15/4206 | |
| | | | 210/418 | |
| 3,335,917 A * | 8/1967 | Knight | A45F 3/16 | |
| | | | 210/453 | |
| 3,430,769 A * | 3/1969 | Sanzenbacher | C02F 1/003 | |
| | | | 210/282 | |
| 3,456,799 A * | 7/1969 | Musial | B01D 35/023 | |
| | | | 210/91 | |
| 3,731,815 A * | 5/1973 | Collingwood | B01D 35/023 | |
| | | | 210/497.2 | |
| 3,749,248 A * | 7/1973 | Dickinson | F01M 1/10 | |
| | | | 210/436 | |
| 3,750,889 A * | 8/1973 | Acosta | B01D 29/52 | |
| | | | 210/499 | |
| 3,905,505 A * | 9/1975 | Gallay | B60K 15/077 | |
| | | | 220/563 | |
| 3,926,348 A * | 12/1975 | Lutzker | B65D 47/121 | |
| | | | 222/563 | |
| 3,927,797 A * | 12/1975 | Flider | B65D 1/20 | |
| | | | 220/768 | |
| 3,942,423 A * | 3/1976 | Herzfeld | C12G 3/07 | |
| | | | 426/112 | |
| 4,009,285 A * | 2/1977 | Spooner | C12G 1/064 | |
| | | | 426/8 | |
| D246,109 S * | 10/1977 | Rosaen | D23/209 | |
| 4,173,656 A * | 11/1979 | Duggins | C12G 3/07 | |
| | | | 99/277.1 | |
| 4,251,032 A * | 2/1981 | Werding | B65D 83/14 | |
| | | | 239/323 | |
| 4,259,184 A * | 3/1981 | D'Arnal | A61J 1/05 | |
| | | | 604/407 | |
| 4,265,752 A * | 5/1981 | O'Banion | B60K 15/0406 | |
| | | | 210/172.6 | |
| 4,397,745 A * | 8/1983 | Troller | B01D 35/027 | |
| | | | 210/406 | |
| 4,423,670 A * | 1/1984 | Tenison | A23L 2/84 | |
| | | | 426/477 | |
| 4,459,208 A * | 7/1984 | Lemon | B01D 35/30 | |
| | | | 184/6.12 | |
| D279,379 S * | 6/1985 | Uram | D7/400 | |
| 4,605,499 A * | 8/1986 | Wise | C02F 1/283 | |
| | | | 210/282 | |
| 4,608,166 A * | 8/1986 | Cain | B01D 29/23 | |
| | | | D23/209 | |
| 4,640,771 A * | 2/1987 | Whalen | B01D 35/0273 | |
| | | | 210/167.01 | |
| 4,695,379 A * | 9/1987 | Nohren, Jr. | B01J 47/012 | |
| | | | 222/481 | |
| 4,714,550 A * | 12/1987 | Malson | C02F 1/003 | |
| | | | 222/401 | |
| 4,717,016 A * | 1/1988 | Dalgleish | A47G 21/183 | |
| | | | 426/77 | |
| 4,764,274 A * | 8/1988 | Miller | C02F 1/283 | |
| | | | 210/477 | |
| 4,767,016 A * | 8/1988 | Cook, Jr. | B65D 55/02 | |
| | | | 222/189.01 | |
| 4,769,144 A * | 9/1988 | Nohren, Jr. | C02F 1/283 | |
| | | | 222/482 | |

(56) References Cited

U.S. PATENT DOCUMENTS

| | | | | |
|---|---|---|---|---|
| 4,792,454 A * | 12/1988 | Lemonnier | | C12G 1/064 426/8 |
| 4,806,369 A * | 2/1989 | Thompson | | A47G 19/16 426/77 |
| 4,821,630 A * | 4/1989 | Roberts | | A47G 19/14 426/77 |
| 4,860,805 A * | 8/1989 | Townsend | | A47C 27/085 210/485 |
| 4,861,478 A * | 8/1989 | Hall | | B01D 35/04 141/286 |
| 4,938,389 A * | 7/1990 | Rossi | | B65D 47/18 604/126 |
| 4,979,654 A * | 12/1990 | Nohren, Jr. | | A47G 19/12 215/314 |
| 4,986,901 A * | 1/1991 | Nohren, Jr. | | C02F 1/283 210/85 |
| 5,025,946 A * | 6/1991 | Butkovich | | B67D 7/344 220/86.3 |
| 5,045,195 A * | 9/1991 | Spangrud | | C02F 1/003 210/291 |
| 5,122,272 A * | 6/1992 | Iana | | A45F 3/16 210/473 |
| 5,167,819 A * | 12/1992 | Iana | | C02F 1/002 222/189.09 |
| 5,197,455 A * | 3/1993 | Tessien | | A47J 37/079 126/144 |
| 5,211,973 A * | 5/1993 | Nohren, Jr. | | A47G 19/12 426/82 |
| 5,265,770 A * | 11/1993 | Matkovich | | B65D 51/1616 222/189.09 |
| D343,759 S * | 2/1994 | Jorgensen | | D7/316 |
| 5,312,545 A * | 5/1994 | Starin | | B01D 35/027 210/172.6 |
| 5,413,925 A * | 5/1995 | Lemonnier | | B01D 63/024 426/8 |
| 5,415,774 A * | 5/1995 | Cowan | | C02F 1/002 210/283 |
| 5,417,860 A * | 5/1995 | Kay | | B01D 35/04 210/485 |
| 5,431,813 A * | 7/1995 | Daniels | | A47G 19/12 210/477 |
| 5,453,189 A * | 9/1995 | Joergensen | | A47G 19/16 210/473 |
| 5,481,960 A * | 1/1996 | Sullivan | | C12H 1/22 426/112 |
| 5,490,938 A * | 2/1996 | Sawan | | B01D 67/0088 210/473 |
| 5,505,849 A * | 4/1996 | Rama, Jr. | | B01D 35/04 210/172.6 |
| 5,536,396 A * | 7/1996 | Mudra | | A47J 31/605 210/474 |
| 5,545,315 A * | 8/1996 | Lonneman | | C02F 1/003 210/275 |
| 5,545,318 A * | 8/1996 | Richmond | | B01D 29/15 210/232 |
| 5,567,308 A * | 10/1996 | Visser | | C02F 1/003 210/477 |
| 5,609,759 A * | 3/1997 | Nohren, Jr. | | C02F 1/003 210/474 |
| 5,616,242 A * | 4/1997 | Mandola | | B01D 35/02 210/485 |
| 5,616,243 A * | 4/1997 | Levy | | A23L 2/72 210/473 |
| 5,623,865 A * | 4/1997 | Sidiropoulos | | B65D 85/812 426/77 |
| 5,635,079 A * | 6/1997 | Becking, II | | C02F 1/283 210/767 |
| 5,653,878 A * | 8/1997 | Reid | | B67D 3/0048 210/474 |
| 5,678,472 A * | 10/1997 | Millman | | A47J 31/18 99/321 |
| 5,681,463 A * | 10/1997 | Shimizu | | B01D 61/18 210/282 |
| 5,688,397 A * | 11/1997 | Malmborg | | B65D 51/1644 210/136 |
| 5,738,786 A * | 4/1998 | Winnington-Ingram | | A47J 31/0615 D7/415 |
| 5,775,205 A * | 7/1998 | Melton | | A47J 31/06 99/279 |
| D396,603 S * | 8/1998 | Gasser | | D7/400 |
| 5,799,836 A * | 9/1998 | Lee | | B65D 47/06 222/189.07 |
| 5,803,316 A * | 9/1998 | Couture | | A47G 19/12 222/189.06 |
| 5,806,562 A * | 9/1998 | Park | | B60T 17/222 285/332 |
| 5,809,868 A * | 9/1998 | Milone | | B65D 85/8085 99/287 |
| 5,829,644 A * | 11/1998 | Brightwell | | B01D 29/05 210/466 |
| 5,840,185 A * | 11/1998 | Hughes | | B01D 35/04 210/477 |
| D404,797 S * | 1/1999 | Jameson | | D23/209 |
| 5,862,739 A * | 1/1999 | Lin | | A47J 31/0605 99/305 |
| 5,869,073 A * | 2/1999 | Sawan | | A01N 25/24 424/407 |
| D410,274 S * | 5/1999 | Bradshaw | | D23/209 |
| 5,913,964 A * | 6/1999 | Melton | | B65D 85/816 99/279 |
| 5,914,045 A * | 6/1999 | Palmer | | C02F 1/003 222/189.09 |
| 5,919,365 A * | 7/1999 | Collette | | C02F 1/003 210/473 |
| 5,928,512 A * | 7/1999 | Hatch | | C02F 1/003 210/429 |
| 5,935,435 A * | 8/1999 | Hasler | | B01D 29/085 210/473 |
| 5,996,473 A * | 12/1999 | Milone | | A47G 19/16 99/287 |
| 6,004,460 A * | 12/1999 | Palmer | | C02F 1/003 222/189.09 |
| 6,033,557 A * | 3/2000 | Gebhard | | B01D 29/15 116/284 |
| 6,095,033 A * | 8/2000 | Melton | | B65D 85/816 99/323 |
| 6,136,188 A * | 10/2000 | Rajan | | B01D 35/26 210/244 |
| 6,136,189 A * | 10/2000 | Smith | | C02F 1/002 210/502.1 |
| 6,153,096 A * | 11/2000 | Nonren, Jr. | | C02F 1/003 210/469 |
| 6,165,362 A * | 12/2000 | Nohren, Jr. | | C02F 1/003 210/502.1 |
| 6,193,886 B1* | 2/2001 | Nohren, Jr. | | C02F 1/003 222/189.09 |
| 6,200,471 B1* | 3/2001 | Nohren, Jr. | | C02F 1/003 210/282 |
| 6,200,484 B1* | 3/2001 | McInnis | | E03F 5/0404 210/170.03 |
| 6,202,542 B1* | 3/2001 | Melton | | B65D 47/0842 99/279 |
| 6,221,416 B1* | 4/2001 | Nohren, Jr. | | C02F 1/688 426/115 |
| D441,421 S * | 5/2001 | Aldred | | D23/209 |
| 6,240,808 B1* | 6/2001 | Gelbard | | B67B 7/10 81/3.41 |
| 6,245,228 B1* | 6/2001 | Kelada | | C02F 1/002 210/473 |
| 6,260,474 B1* | 7/2001 | Yahav | | B65D 51/24 426/11 |
| 6,269,736 B1* | 8/2001 | Melton | | A47J 31/02 99/279 |
| 6,277,284 B1* | 8/2001 | Nohren | | A47G 19/2266 210/660 |

(56) References Cited

U.S. PATENT DOCUMENTS

| | | | | |
|---|---|---|---|---|
| 6,283,013 B1* | 9/2001 | Romandy | A47J 31/0636 | 99/322 |
| 6,303,023 B1* | 10/2001 | Gebhard | B01D 29/15 | 116/284 |
| D450,106 S * | 11/2001 | Herr | D23/261 | |
| 6,314,866 B1* | 11/2001 | Melton | B65D 85/816 | 426/433 |
| 6,344,146 B1* | 2/2002 | Moorehead | C02F 1/003 | 210/232 |
| 6,354,344 B1* | 3/2002 | Pluta | B67D 3/0029 | 141/192 |
| 6,374,726 B1* | 4/2002 | Melton | A47G 19/16 | 99/275 |
| 6,379,429 B1* | 4/2002 | Scranton, Jr. | B01D 53/0415 | 96/108 |
| 6,383,381 B1* | 5/2002 | O'Flynn | B01D 29/035 | 210/477 |
| 6,395,170 B1* | 5/2002 | Hughes | B01D 35/02 | 222/189.1 |
| 6,440,303 B2* | 8/2002 | Spriegel | B01D 29/15 | 210/232 |
| 6,468,435 B1* | 10/2002 | Hughes | B01D 35/04 | 210/473 |
| 6,475,386 B1* | 11/2002 | Carr | B01J 20/18 | 210/283 |
| 6,478,956 B2* | 11/2002 | Kaura | B01D 29/05 | 210/450 |
| 6,523,555 B2* | 2/2003 | Baccini | A47J 43/24 | 134/182 |
| 6,523,711 B1* | 2/2003 | Hughes | B05B 11/1097 | 239/33 |
| 6,541,055 B1* | 4/2003 | Luzenberg | B65D 51/24 | 426/82 |
| 6,561,234 B2* | 5/2003 | Pluta | B67D 3/0029 | 141/192 |
| 6,569,329 B1* | 5/2003 | Nohren, Jr. | B01D 35/027 | 210/489 |
| 6,656,350 B2* | 12/2003 | Kitakaze | C02F 1/003 | 210/232 |
| 6,689,279 B1* | 2/2004 | Train | B01D 17/0214 | 99/496 |
| D487,227 S * | 3/2004 | Haley | D9/434 | |
| 6,732,635 B2* | 5/2004 | Jensen | A47J 31/14 | 210/477 |
| 6,733,669 B1* | 5/2004 | Crick | C02F 1/003 | 210/473 |
| D495,458 S * | 8/2004 | Baldinger | D32/30 | |
| 6,786,137 B1* | 9/2004 | Shen | A47J 31/18 | 99/279 |
| D498,967 S * | 11/2004 | White | D7/300.2 | |
| 6,840,042 B1* | 1/2005 | Taylor | F16H 39/14 | 60/487 |
| 6,849,179 B1* | 2/2005 | Taylor | B01D 35/027 | 184/6.24 |
| 6,858,134 B2* | 2/2005 | Yates | B01D 35/153 | 210/167.01 |
| 6,901,847 B1* | 6/2005 | Shen | A47J 31/18 | 99/279 |
| 6,960,295 B2* | 11/2005 | Chaouachi | A47J 27/21183 | 210/473 |
| D513,314 S * | 12/2005 | Iddings | D23/365 | |
| 7,025,878 B2* | 4/2006 | Spriegel | B01D 29/46 | 210/232 |
| 7,051,648 B2* | 5/2006 | Fenaroli | A47G 19/16 | 426/77 |
| D526,383 S * | 8/2006 | Byerly | D23/209 | |
| 7,160,447 B2* | 1/2007 | Yates | B01D 35/027 | 210/167.04 |
| D536,205 S * | 2/2007 | Jensen | D7/300.1 | |
| 7,178,426 B2* | 2/2007 | Turner | F16H 57/0447 | 184/11.1 |
| 7,213,507 B2* | 5/2007 | Glucksman | A47J 31/20 | 99/287 |
| 7,219,600 B1* | 5/2007 | Haven | A47J 31/20 | 99/322 |
| 7,225,949 B2* | 6/2007 | Kubo | B65D 51/1616 | 222/189.09 |
| D551,318 S * | 9/2007 | MacNeil | D23/209 | |
| 7,297,281 B2* | 11/2007 | Ali | C02F 1/002 | 210/85 |
| D560,091 S * | 1/2008 | Bodum | D7/312 | |
| D563,161 S * | 3/2008 | Bodum | D7/400 | |
| D565,340 S * | 4/2008 | Bodum | D7/319 | |
| D567,020 S * | 4/2008 | Bodum | D7/400 | |
| D575,105 S * | 8/2008 | Gauss | D7/397 | |
| 7,416,087 B2* | 8/2008 | Press | B65D 47/06 | 210/473 |
| 7,427,355 B2* | 9/2008 | Chau | C02F 1/002 | 210/282 |
| 7,429,322 B2* | 9/2008 | Fujita | F02M 37/34 | 210/172.6 |
| 7,464,637 B1* | 12/2008 | Lin | A47J 31/0636 | 99/322 |
| 7,473,362 B1* | 1/2009 | Nohren, Jr. | C02F 1/002 | 210/660 |
| 7,484,457 B2* | 2/2009 | Henderson | A47J 43/284 | 99/485 |
| 7,507,338 B2* | 3/2009 | Bommi | C02F 1/002 | 210/266 |
| D594,268 S * | 6/2009 | Bodum | D7/319 | |
| D596,459 S * | 7/2009 | Ghiassi | D7/510 | |
| D596,703 S * | 7/2009 | McKinney | D23/209 | |
| 7,585,409 B2* | 9/2009 | Bommi | B01D 21/02 | 210/120 |
| 7,591,219 B2* | 9/2009 | Saha | A47J 31/20 | 100/211 |
| 7,607,592 B1* | 10/2009 | Kim | A01G 25/14 | 239/377 |
| D603,648 S * | 11/2009 | Bodum | D7/312 | |
| D604,800 S * | 11/2009 | Vreeland | D23/209 | |
| 7,713,483 B2* | 5/2010 | Maiden | B01D 29/96 | 422/64 |
| D621,660 S * | 8/2010 | Smiedt | D9/503 | |
| 7,785,516 B2* | 8/2010 | Malkin | B01D 29/15 | 264/DIG. 48 |
| 7,810,651 B2* | 10/2010 | Miga, Jr. | C02F 1/002 | 210/450 |
| 7,837,865 B2* | 11/2010 | Wadstrom | A61L 2/26 | 210/473 |
| 7,849,785 B1* | 12/2010 | Saha | A47J 31/005 | 100/211 |
| D631,285 S * | 1/2011 | Smiedt | D7/392.1 | |
| D631,286 S * | 1/2011 | Smiedt | D7/392.1 | |
| 7,862,720 B2* | 1/2011 | Brown | C02F 1/002 | 210/473 |
| 7,895,939 B2* | 3/2011 | Pan | A47J 31/20 | 99/322 |
| D637,698 S * | 5/2011 | Greene | D23/268 | |
| 7,959,799 B2* | 6/2011 | Happel | B01D 21/0012 | 210/166 |
| D644,072 S * | 8/2011 | McDonald | D7/667 | |
| 7,993,518 B2* | 8/2011 | Shani | C02F 1/002 | 210/466 |
| 8,029,667 B2* | 10/2011 | Santinon | B60K 15/04 | 210/172.6 |
| 8,038,878 B2* | 10/2011 | Hewkin | F01P 11/029 | 210/434 |
| 8,051,997 B2* | 11/2011 | Buckley | A47G 23/16 | 215/230 |
| 8,079,301 B2* | 12/2011 | Birch | A47G 19/14 | 99/317 |
| 8,123,086 B2* | 2/2012 | Haley | B65D 47/06 | 222/189.09 |
| 8,128,820 B2* | 3/2012 | Wu | C02F 1/003 | 210/260 |
| 8,137,552 B2* | 3/2012 | Kisterev | C12H 1/04 | 210/449 |

(56) References Cited

U.S. PATENT DOCUMENTS

| | | | | |
|---|---|---|---|---|
| 8,142,654 | B2 * | 3/2012 | Kohl | C02F 1/002 210/291 |
| D659,473 | S * | 5/2012 | Ghiassi | D7/510 |
| 8,182,683 | B1 * | 5/2012 | Allen | C02F 1/003 210/244 |
| 8,182,702 | B2 * | 5/2012 | Al-Sannaa | B01D 46/4236 210/806 |
| 8,205,541 | B2 * | 6/2012 | Barberio | B67D 3/0051 99/323.1 |
| D663,580 | S * | 7/2012 | Vagnby | D7/400 |
| 8,216,462 | B2 * | 7/2012 | O'Brien | C02F 1/002 210/94 |
| 8,221,813 | B2 * | 7/2012 | Boul | A47J 31/08 426/594 |
| 8,245,870 | B2 * | 8/2012 | McKinney | A47G 19/2266 220/703 |
| 8,277,666 | B2 * | 10/2012 | Sturgess | C02F 1/002 210/416.3 |
| 8,307,755 | B2 * | 11/2012 | Shen | A47J 31/005 220/709 |
| 8,337,697 | B2 * | 12/2012 | Risheq | C02F 1/002 210/474 |
| 8,365,964 | B2 * | 2/2013 | Federighi | B01F 25/31242 222/481.5 |
| 8,424,448 | B2 * | 4/2013 | Englert | A47J 27/2105 99/321 |
| D686,296 | S * | 7/2013 | Melzer | D23/209 |
| D687,677 | S * | 8/2013 | Sturgess | D7/510 |
| D691,418 | S * | 10/2013 | Minton | D7/400 |
| D694,852 | S * | 12/2013 | Gordon | D23/209 |
| 8,597,512 | B2 * | 12/2013 | Sturgess | C02F 1/002 210/416.3 |
| 8,746,480 | B2 * | 6/2014 | Wholey | B60K 15/0403 220/86.3 |
| 8,758,605 | B2 * | 6/2014 | Risheq | C02F 1/003 210/120 |
| 8,845,895 | B1 * | 9/2014 | Ghiassi | C02F 1/002 210/429 |
| D716,414 | S * | 10/2014 | Glen | D23/209 |
| 8,858,794 | B2 * | 10/2014 | Lappeman | B65F 1/02 210/241 |
| D718,572 | S * | 12/2014 | Sturgess | D9/450 |
| 8,904,920 | B2 * | 12/2014 | Siu | A47J 31/18 99/317 |
| 8,926,840 | B2 * | 1/2015 | Hull | A47G 19/2272 220/709 |
| 8,985,377 | B2 * | 3/2015 | Lane | A47J 31/0636 206/5 |
| 9,004,292 | B2 * | 4/2015 | Carter | C02F 1/002 210/464 |
| 9,010,238 | B2 * | 4/2015 | Bodum | A47J 31/36 222/475.1 |
| D729,571 | S * | 5/2015 | Wilson | D7/400 |
| D730,730 | S * | 6/2015 | Haley | D9/440 |
| D731,617 | S * | 6/2015 | Kohl | D23/209 |
| 9,045,353 | B2 * | 6/2015 | Parekh | C02F 1/42 |
| RE45,611 | E * | 7/2015 | Haley | B65D 47/141 |
| 9,089,239 | B2 * | 7/2015 | Billadeau | A47J 31/005 |
| D742,175 | S * | 11/2015 | Rashid | D7/529 |
| D745,308 | S * | 12/2015 | Roth | D23/209 |
| 9,205,292 | B2 * | 12/2015 | Riordan | A62C 4/00 |
| D747,140 | S * | 1/2016 | Roth | D23/209 |
| D747,924 | S * | 1/2016 | Roth | D23/209 |
| 9,238,187 | B2 * | 1/2016 | Kawaguchi | B01D 29/15 |
| 9,248,390 | B2 * | 2/2016 | Hudgens | B01D 29/117 |
| D753,790 | S * | 4/2016 | Torgerud | D23/209 |
| D753,791 | S * | 4/2016 | Rashid | D23/209 |
| D757,492 | S * | 5/2016 | Ming | D7/400 |
| 9,359,183 | B2 * | 6/2016 | Henderson | B67D 3/0051 |
| D764,864 | S * | 8/2016 | Hertaus | D7/400 |
| 9,409,698 | B2 * | 8/2016 | Har-Shai | A61M 5/148 |
| 9,469,550 | B2 * | 10/2016 | Closi, Jr. | C02F 1/002 |
| 9,486,725 | B2 * | 11/2016 | Ries | B01D 35/0276 |
| 9,498,086 | B2 * | 11/2016 | Waggoner | B01F 25/31433 |
| D776,239 | S * | 1/2017 | Westrick | D23/209 |
| D781,646 | S * | 3/2017 | Roth | D7/400 |
| 9,586,733 | B2 * | 3/2017 | Garza | B65D 1/06 |
| D785,142 | S * | 4/2017 | Monaghan | D23/261 |
| 9,629,379 | B2 * | 4/2017 | Lown | A23F 3/18 |
| 9,656,191 | B2 * | 5/2017 | Hull | A47G 19/2266 |
| RE46,506 | E * | 8/2017 | Haley | B65D 47/32 |
| D794,392 | S * | 8/2017 | Rashid | D9/503 |
| 9,745,105 | B2 * | 8/2017 | Parekh | B65D 47/265 |
| 9,796,600 | B2 * | 10/2017 | Shotey | A47J 31/20 |
| 9,801,492 | B1 * | 10/2017 | Lin | A47J 31/0636 |
| 9,833,731 | B2 * | 12/2017 | Carter | C02F 1/002 |
| 9,868,627 | B2 * | 1/2018 | Batistakis | B67D 7/005 |
| 9,877,606 | B2 * | 1/2018 | Kim | A47J 31/005 |
| 9,901,167 | B2 * | 2/2018 | Anderson | B21D 47/04 |
| D812,183 | S * | 3/2018 | McGavin | D22/122 |
| D815,247 | S * | 4/2018 | Homer | D23/209 |
| D815,714 | S * | 4/2018 | Bell | D23/209 |
| D815,895 | S * | 4/2018 | Roth | D23/209 |
| 9,938,057 | B2 * | 4/2018 | Carsello | B65D 33/00 |
| 9,944,442 | B2 * | 4/2018 | Carsello | B65D 47/06 |
| 9,982,418 | B2 * | 5/2018 | Bennett | E03B 7/095 |
| D820,638 | S * | 6/2018 | Chitayat | D7/400 |
| 9,997,754 | B2 * | 6/2018 | Beylich | H01M 50/24 |
| 10,005,009 | B2 * | 6/2018 | Qureshi | B01D 35/027 |
| 10,029,132 | B2 * | 7/2018 | Cray | A62C 3/065 |
| 10,035,713 | B2 * | 7/2018 | Dani | C02F 1/283 |
| 10,105,004 | B2 * | 10/2018 | Salas-de la Cruz | C02F 1/002 |
| 10,125,027 | B2 * | 11/2018 | Dani | C02F 1/002 |
| 10,196,282 | B2 * | 2/2019 | Boudreau | C02F 1/003 |
| 10,206,411 | B2 * | 2/2019 | Lown | A23F 3/18 |
| 10,232,390 | B2 * | 3/2019 | Massold | B05B 15/40 |
| 10,272,371 | B2 * | 4/2019 | Lombardo | B01D 35/30 |
| 10,280,388 | B2 * | 5/2019 | Pellaud | B65B 51/04 |
| 10,307,625 | B2 * | 6/2019 | Cray | A62C 3/065 |
| 10,307,697 | B2 * | 6/2019 | Savoy | C02F 1/003 |
| 10,328,366 | B2 * | 6/2019 | Hudgens | B01D 35/027 |
| 10,343,931 | B2 * | 7/2019 | Dani | B01D 29/114 |
| 10,351,442 | B2 * | 7/2019 | Dani | B01D 29/0097 |
| 10,376,103 | B2 * | 8/2019 | Rizzuto | B65D 43/02 |
| 10,391,427 | B2 * | 8/2019 | Dani | B01D 29/96 |
| 10,391,461 | B2 * | 8/2019 | Alfoudari | B01F 27/808 |
| 10,441,902 | B2 * | 10/2019 | Tange | B01D 29/117 |
| 10,463,999 | B2 * | 11/2019 | Washington | B01D 35/005 |
| 10,479,697 | B2 * | 11/2019 | Dani | B01D 29/15 |
| D876,887 | S * | 3/2020 | Barber | D7/400 |
| D877,565 | S * | 3/2020 | Pehar | D7/532 |
| 10,654,725 | B2 * | 5/2020 | Dani | C02F 1/283 |
| D888,194 | S * | 6/2020 | Cordova | D23/209 |
| D888,495 | S * | 6/2020 | Davis | D7/532 |
| 10,683,159 | B2 * | 6/2020 | Har-Shai | A62C 13/00 |
| 10,702,046 | B2 * | 7/2020 | Rajan | C02F 1/003 |
| 10,722,828 | B2 * | 7/2020 | Shotey | B01D 35/05 |
| 10,743,557 | B2 * | 8/2020 | Hampton | A23C 11/103 |
| 10,765,973 | B2 * | 9/2020 | Dani | B01D 29/111 |
| 10,792,525 | B2 * | 10/2020 | Cray | A62C 3/065 |
| D902,651 | S * | 11/2020 | Lee | D7/400 |
| D907,438 | S * | 1/2021 | Sakamoto | D7/511 |
| 11,001,508 | B2 * | 5/2021 | Dani | C02F 1/003 |
| 11,045,751 | B2 * | 6/2021 | Dani | B01D 29/96 |
| 11,066,311 | B2 * | 7/2021 | Dani | C02F 1/283 |
| 11,097,957 | B2 * | 8/2021 | Cordova | C02F 1/283 |
| 11,154,156 | B2 * | 10/2021 | Redington | A47J 31/005 |
| 11,174,172 | B2 * | 11/2021 | Dani | C02F 1/003 |
| 11,179,660 | B2 * | 11/2021 | Hales | B01D 29/21 |
| 11,199,253 | B2 * | 12/2021 | Trimmer | F16H 57/0483 |
| 11,213,160 | B2 * | 1/2022 | Tsigounis | A47J 31/005 |
| 11,219,298 | B2 * | 1/2022 | Rajan | A45F 3/20 |
| 11,224,830 | B2 * | 1/2022 | Wildermuth | B01D 29/96 |
| 11,229,864 | B2 * | 1/2022 | Nodomi | B01D 35/0276 |
| 11,319,124 | B2 * | 5/2022 | Meadows | B01D 15/361 |
| 11,357,238 | B2 * | 6/2022 | Lown | A47J 31/06 |
| 11,364,456 | B2 * | 6/2022 | Macoretta | B01D 29/05 |
| 11,407,652 | B2 * | 8/2022 | Dani | B01D 29/15 |
| 11,433,324 | B2 * | 9/2022 | Cabbage | C02F 1/44 |
| 11,452,399 | B1 * | 9/2022 | Murphy | A47J 19/005 |
| 11,465,914 | B2 * | 10/2022 | Pehar | A45F 3/16 |
| 11,518,581 | B2 * | 12/2022 | Parekh | B65D 47/265 |

(56) References Cited

U.S. PATENT DOCUMENTS

| | | | | |
|---|---|---|---|---|
| 11,524,252 B2 * | 12/2022 | Aquilina | | E04H 4/1272 |
| D978,610 S * | 2/2023 | Birdwell | | D7/400 |
| 11,577,976 B2 * | 2/2023 | Miller | | C02F 1/68 |
| 11,583,811 B2 * | 2/2023 | Waggoner | | B01F 25/315 |
| D980,385 S * | 3/2023 | Huang | | D23/209 |
| 11,648,568 B2 * | 5/2023 | VanFleet | | B05B 11/1042 |
| | | | | 222/207 |
| 11,685,593 B2 * | 6/2023 | Cherny | | B65D 83/754 |
| | | | | 222/189.06 |
| D992,094 S * | 7/2023 | Ramkarran | | D23/261 |
| D995,203 S * | 8/2023 | Chen | | D7/392.1 |
| D995,716 S * | 8/2023 | Huang | | D23/209 |
| 2002/0036176 A1 | 3/2002 | Hughes | | C02F 1/003 |
| | | | | 210/473 |
| 2002/0070154 A1 * | 6/2002 | Kitakaze | | C02F 1/003 |
| | | | | 210/284 |
| 2002/0083841 A1 * | 7/2002 | Chaouachi | | C02F 1/003 |
| | | | | 99/279 |
| 2002/0117442 A1 * | 8/2002 | Kaura | | B01D 29/05 |
| | | | | 210/474 |
| 2002/0170618 A1 * | 11/2002 | Pluta | | C02F 1/003 |
| | | | | 141/286 |
| 2003/0127385 A1 * | 7/2003 | Spriegel | | B01D 29/15 |
| | | | | 210/484 |
| 2004/0069148 A1 * | 4/2004 | Fenaroli | | A47G 19/16 |
| | | | | 99/275 |
| 2004/0118761 A1 * | 6/2004 | Yates | | B01D 35/027 |
| | | | | 210/450 |
| 2005/0035041 A1 * | 2/2005 | Nohren, Jr. | | C02F 1/002 |
| | | | | 210/321.89 |
| 2005/0051476 A1 * | 3/2005 | Chen | | C02F 1/002 |
| | | | | 210/450 |
| 2005/0092553 A1 * | 5/2005 | Yagi | | G01F 23/58 |
| | | | | 184/6.5 |
| 2005/0109685 A1 * | 5/2005 | Fujita | | F02M 37/34 |
| | | | | 210/416.4 |
| 2005/0183997 A1 * | 8/2005 | Happel | | E03F 5/0404 |
| | | | | 210/163 |
| 2005/0184026 A1 * | 8/2005 | Haley | | B65D 51/24 |
| | | | | 222/484 |
| 2005/0263006 A1 * | 12/2005 | Saha | | A47J 43/27 |
| | | | | 99/275 |
| 2005/0279768 A1 * | 12/2005 | Chatrath | | B01D 63/024 |
| | | | | 222/189.06 |
| 2005/0284303 A1 * | 12/2005 | Zell | | A47J 41/0011 |
| | | | | 99/279 |
| 2006/0060530 A1 * | 3/2006 | Ali | | B01J 20/20 |
| | | | | 210/502.1 |
| 2006/0107638 A1 * | 5/2006 | Holzmann | | B01D 46/64 |
| | | | | 55/498 |
| 2006/0157398 A1 * | 7/2006 | Nohren, Jr. | | B01D 61/18 |
| | | | | 210/321.87 |
| 2007/0089614 A1 * | 4/2007 | Tremblay | | A47J 31/08 |
| | | | | 99/495 |
| 2007/0158251 A1 * | 7/2007 | Chau | | C02F 1/002 |
| | | | | 210/443 |
| 2007/0221554 A1 * | 9/2007 | Wright | | B01D 46/0087 |
| | | | | 210/120 |
| 2008/0087624 A1 * | 4/2008 | Buckley | | A47G 23/16 |
| | | | | 215/230 |
| 2008/0203005 A1 * | 8/2008 | Francisco | | B01D 61/18 |
| | | | | 210/238 |
| 2008/0203007 A1 * | 8/2008 | Jang | | C02F 1/002 |
| | | | | 210/348 |
| 2008/0251443 A1 * | 10/2008 | Ali | | B01J 20/28007 |
| | | | | 210/502.1 |
| 2009/0039037 A1 * | 2/2009 | O'Brien | | C02F 1/002 |
| | | | | 210/791 |
| 2009/0145839 A1 * | 6/2009 | Miga, Jr. | | C02F 1/002 |
| | | | | 210/466 |
| 2009/0178573 A1 * | 7/2009 | Pan | | A47J 41/0011 |
| | | | | 99/323 |
| 2009/0202691 A1 * | 8/2009 | Gauger | | A47J 31/20 |
| | | | | 210/473 |
| 2009/0236341 A1 * | 9/2009 | McKinney | | A47G 19/2266 |
| | | | | 220/711 |
| 2010/0155345 A1 * | 6/2010 | Al-Sannaa | | B01D 35/02 |
| | | | | 210/806 |
| 2010/0170839 A1 * | 7/2010 | Kohl | | C02F 1/002 |
| | | | | 210/232 |
| 2010/0193462 A1 * | 8/2010 | Roth | | C02F 1/002 |
| | | | | 215/229 |
| 2010/0219151 A1 * | 9/2010 | Risheq | | C02F 1/003 |
| | | | | 210/348 |
| 2010/0230345 A1 * | 9/2010 | Chen | | C02F 1/002 |
| | | | | 210/287 |
| 2010/0237002 A1 * | 9/2010 | Shani | | B01D 61/18 |
| | | | | 210/466 |
| 2010/0263549 A1 * | 10/2010 | Lee | | A47J 31/18 |
| | | | | 99/319 |
| 2010/0320135 A1 * | 12/2010 | Sun | | C02F 1/003 |
| | | | | 210/244 |
| 2011/0036763 A1 * | 2/2011 | Santinon | | B01D 35/30 |
| | | | | 210/232 |
| 2011/0056386 A1 * | 3/2011 | Taketani | | A47G 19/14 |
| | | | | 99/317 |
| 2011/0219956 A1 * | 9/2011 | Englert | | A47J 31/0636 |
| | | | | 219/432 |
| 2011/0226133 A1 * | 9/2011 | Shen | | A47J 31/005 |
| | | | | 99/316 |
| 2011/0278206 A1 * | 11/2011 | Hull | | C02F 1/003 |
| | | | | 210/85 |
| 2011/0278216 A1 * | 11/2011 | Hull | | B65D 55/16 |
| | | | | 210/469 |
| 2012/0055862 A1 * | 3/2012 | Parekh | | C02F 1/42 |
| | | | | 210/244 |
| 2012/0067807 A1 * | 3/2012 | Lappeman | | B01D 35/027 |
| | | | | 210/301 |
| 2012/0156114 A1 * | 6/2012 | Ziegmann | | B01L 3/02 |
| | | | | 422/513 |
| 2012/0187036 A1 * | 7/2012 | Risheq | | C02F 1/003 |
| | | | | 210/466 |
| 2012/0255890 A1 * | 10/2012 | Cumberland | | C02F 1/003 |
| | | | | 210/232 |
| 2012/0312759 A1 * | 12/2012 | Ries | | F02M 37/50 |
| | | | | 210/172.6 |
| 2012/0325735 A1 * | 12/2012 | Dicks | | C02F 1/003 |
| | | | | 210/291 |
| 2013/0032566 A1 * | 2/2013 | Lee | | C02F 1/002 |
| | | | | 215/388 |
| 2013/0092290 A1 * | 4/2013 | Waymire | | B60K 15/0403 |
| | | | | 141/286 |
| 2013/0186811 A1 * | 7/2013 | Kaiser | | E03F 5/0404 |
| | | | | 210/163 |
| 2013/0199989 A1 * | 8/2013 | Carter | | A47G 19/2266 |
| | | | | 222/189.06 |
| 2013/0233890 A1 * | 9/2013 | Melzer | | C02F 1/003 |
| | | | | 222/189.06 |
| 2013/0264262 A1 * | 10/2013 | Closi, Jr. | | C02F 1/002 |
| | | | | 210/467 |
| 2014/0027365 A1 * | 1/2014 | Lee | | C02F 1/002 |
| | | | | 210/232 |
| 2014/0054236 A1 * | 2/2014 | Bennett | | E03B 7/095 |
| | | | | 210/170.03 |
| 2014/0174965 A1 * | 6/2014 | Herling | | A47J 41/0077 |
| | | | | 206/216 |
| 2014/0224725 A1 * | 8/2014 | Uspenski | | A47J 31/005 |
| | | | | 210/444 |
| 2014/0232022 A1 * | 8/2014 | Chung | | F24F 6/12 |
| | | | | 261/78.1 |
| 2014/0238915 A1 * | 8/2014 | McInnis | | E03F 5/0404 |
| | | | | 210/170.03 |
| 2014/0251153 A1 * | 9/2014 | Tien | | A47J 31/18 |
| | | | | 99/322 |
| 2014/0251938 A1 * | 9/2014 | Rose | | B65D 51/242 |
| | | | | 215/6 |
| 2015/0076050 A1 * | 3/2015 | May | | B01D 35/02 |
| | | | | 210/232 |

(56) References Cited

U.S. PATENT DOCUMENTS

| | | | |
|---|---|---|---|
| 2015/0190741 A1* | 7/2015 | Washington | B01D 35/005 141/11 |
| 2015/0230651 A1* | 8/2015 | Molayem | A47J 41/0044 99/322 |
| 2015/0232318 A1* | 8/2015 | Meldeau | B67D 3/0061 222/189.06 |
| 2015/0246824 A1* | 9/2015 | Boudreau | C02F 1/003 210/244 |
| 2015/0374169 A1* | 12/2015 | Salas-de la Cruz | C02F 1/002 99/290 |
| 2016/0075477 A1* | 3/2016 | Halioua | A47J 31/446 220/592.16 |
| 2016/0167980 A1* | 6/2016 | Dani | C02F 1/283 210/466 |
| 2016/0193553 A1* | 7/2016 | Qureshi | B01D 29/27 210/314 |
| 2016/0198905 A1* | 7/2016 | Casey | A47J 43/27 366/130 |
| 2016/0220925 A1* | 8/2016 | Savoy | B01D 27/06 |
| 2016/0376161 A1* | 12/2016 | Dani | C02F 1/003 210/660 |
| 2016/0376162 A1* | 12/2016 | Dani | C02F 1/002 210/266 |
| 2016/0376163 A1* | 12/2016 | Dani | C02F 1/003 210/419 |
| 2016/0376164 A1* | 12/2016 | Dani | C02F 1/003 210/444 |
| 2016/0376165 A1* | 12/2016 | Dani | C02F 1/003 210/444 |
| 2017/0001880 A1* | 1/2017 | Dani | B01D 35/30 |
| 2017/0326482 A1* | 11/2017 | Prchal | B01D 35/00 |
| 2018/0001235 A1* | 1/2018 | Tange | B01D 29/902 |
| 2018/0016158 A1* | 1/2018 | McDonald | B67D 3/0019 |
| 2018/0215630 A9* | 8/2018 | Dani | C02F 1/42 |
| 2018/0250615 A1* | 9/2018 | Dani | B01D 29/216 |
| 2018/0264382 A1* | 9/2018 | Dani | B01D 27/08 |
| 2018/0265374 A1* | 9/2018 | Dani | B01D 29/114 |
| 2018/0274657 A1* | 9/2018 | Trimmer | B01D 35/306 |
| 2020/0054973 A1* | 2/2020 | Wildermuth | B01D 35/02 |
| 2020/0087166 A1* | 3/2020 | Dani | B01D 35/30 |
| 2020/0189932 A1* | 6/2020 | Cordova | B01D 39/04 |
| 2020/0276527 A1* | 9/2020 | Macoretta | B67D 3/0093 |
| 2021/0001251 A1* | 1/2021 | Nodomi | B01D 29/23 |
| 2022/0297034 A1* | 9/2022 | Donovan | B67D 3/04 |

* cited by examiner

EXPANDABLE STRAINER INSERT FOR BOTTLES

FIELD OF THE INVENTION

In one embodiment, this invention relates to bottled beverages that have been infused with extracts from plant materials.

In another embodiment, this invention relates to an infuser system that can be used to infuse flavors into a beverage.

In a further embodiment, this invention relates to a method for making beverages that have been infused with extracts from plant materials.

BACKGROUND OF THE INVENTION

Beverage presentation and taste can be improved by the addition of visible materials from plants. For example, iced tea looks and tastes better with fresh lemon and mint.

However, off-the-shelf beverages don't contain these materials. There isn't space in local convenience store coolers occupied by beverages containing visible pieces of fruits, vegetables, herbs or spices.

The beverage industry may be "Missing the Boat" by not being able to add entirely or almost-entirely non-processed organic flavors to their product. Plus, the mixed product can be more attractive to the eye of the consumer. Imagine a fruity, spiced or herbed drink as something you could see in your local convenience stores cooler between the bottled water and sports drinks.

Fruit infused beverage is an increasingly popular refreshment. However, the bottles used to contain the infused liquid are typically bulky and don't fit well in cup holders. A system that could be used to provide fruit infused beverage in a sleek bottle that fits a cup holder would be very desirable.

A popular size for a cupholder-sized disposable plastic water bottle is 0.5 liters (16.9 fluid oz), such bottle having a neck ID is of about 0.85 inches (21.6 mm). A popular size for sports drinks in a cupholder sized disposable plastic bottles is 20 fluid oz (591 ml), such bottles having a neck ID of about 1.28 inches (32.5 mm). It would be desirable to provide a fruit infuser system for such bottles so that they could be recycled and so that they would be convenience store racks currently in use.

Although the invention is not limited to cupholder sized bottles, it is expected to provide good benefits when used in conjunction with such sized bottles.

OBJECTS OF THE INVENTION

It is an object of this invention to provide beverages containing visible pieces of fruits, vegetables, herbs or spices.

It is another object of this invention to provide a device that separates the solids from the liquids in a beverage for safety's sake.

It is a further object of this invention to provide an infuser system to add natural flavors to a beverage that is especially useful with cupholder sized bottles.

SUMMARY OF THE INVENTION

One embodiment of the invention provides a method for preparing a plant matter flavored beverage for later consumption. The method is carried out by inserting plant matter into a bottle through the neck of the bottle. Afterwards, a generally tubular strainer is inserted into the bottle. The tubular strainer has a flange that sealingly abuts against the neck of the bottle. The bottle is filled with a water-based liquid and capped.

By inserting the plant matter before the strainer, the plant matter is trapped between the strainer and the bottle wall, making it visible from the outside if the bottle is clear. The strainer prevents the plant matter from being ingested by the user.

As examples, the beverage could be tea with lemon and/or mint, or lemonade with lemon.

Another embodiment of the invention provides a bottle/beverage assembly that can be made by the just-described method. The assembly comprises a plastic bottle, an insert, and a mixture of beverage and plant matter, and a solution of beverage and plant matter extract. The bottle preferably has a volume in the range of 0.4 L to 0.8 L. The bottle defines a neck having an inside diameter in the range of 20 to 35 mm. The neck terminates in an annular sealing surface. The bottle has a main body of larger inside diameter than the neck. The insert extends into the bottle through the neck. The insert has a tubular imperforate section positioned in the neck of the bottle and a porous section positioned in the main body of the bottle. The insert defines an annular flange on an exterior of the imperforate section sealingly positioned against the annular sealing surface of the bottle. A chamber of annular cross section is defined between the porous section of the insert and the main body of the bottle. A mixture of beverage and plant matter is located in the chamber, and a solution of beverage and plant matter extracts from the plant matter is located in the insert.

Disposable clear plastic bottles of the described size are in common use and are sized to fit in cup holders of automobiles and chairs as well as in racks at convenience stores. The invention provides a new application for those bottles as well as an avenue for recycling them for home use.

Another embodiment of the invention provides an elongated filter insert for a bottle that can be used in the combination above described. The elongated insert has a first end, a second end, and a longitudinal axis extending between the first end and the second end. The elongated insert has a hollow inside and an axially directed opening at the first end communicating with the hollow inside. The bottle insert has a porous section establishing a multiplicity of lateral flow paths into the hollow and an imperforate section between the porous section and the first end. The porous section is diametrically expandable to a larger diameter than the imperforate section, preferably by relaxing after it has been inserted through the bottle neck.

DETAILED DESCRIPTION OF THE INVENTION

Figure 1:
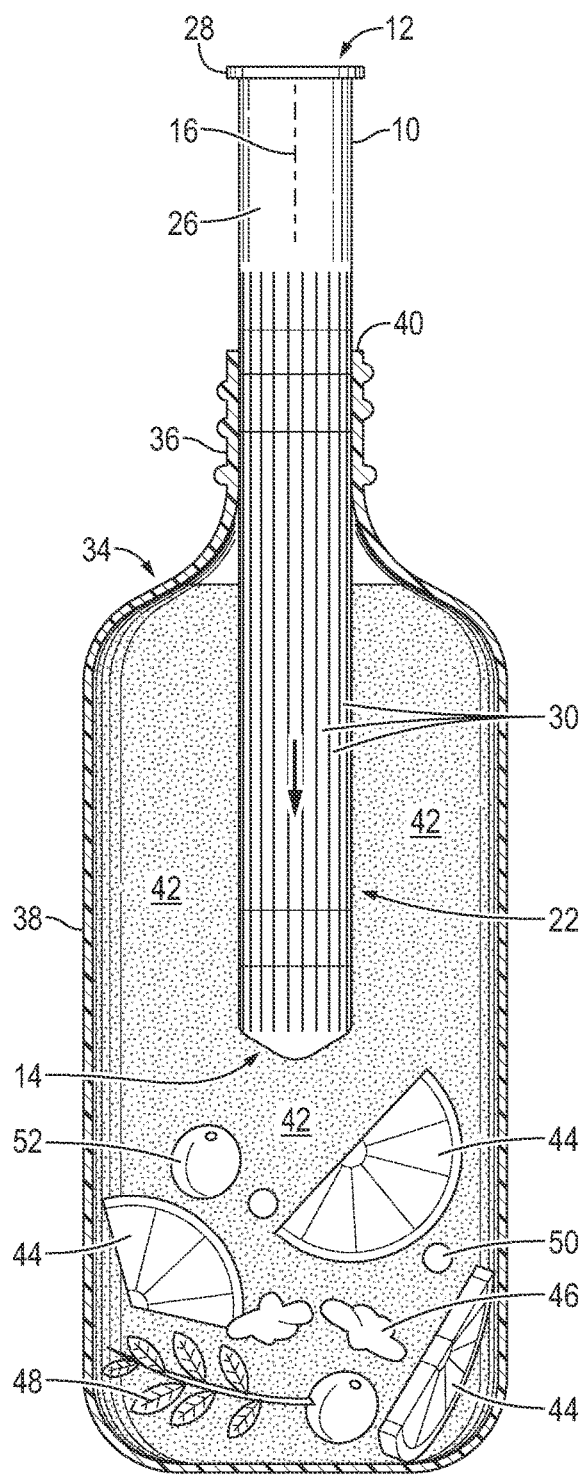
FIG. 1 is a partial cross-sectional view illustrating an early stage of forming an embodiment of the invention.
Figure 2:
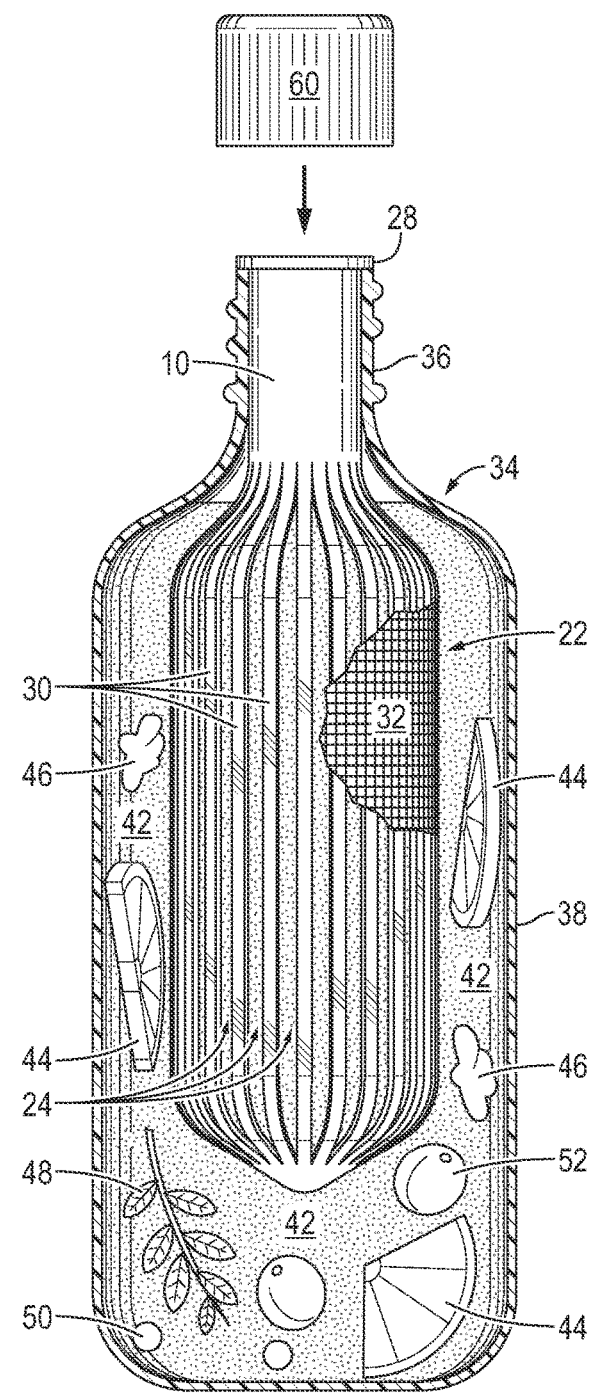
FIG. 2 is a partial cross-sectional view of the embodiment of the invention shown in FIG. 1 at a later stage of making.

One embodiment of the invention provides an elongated filter insert 10, 110, for a bottle. The elongated insert 10 has a first end 12, a second end 14, and a longitudinal axis 16 extending between the first end and the second end. The elongated insert has a hollow inside 18 and an axially directed opening 20 at the first end communicating with the hollow inside. The bottle insert has a porous section 22 establishing a multiplicity of lateral flow paths 24 into the hollow and an imperforate section 26 between the porous section and the first end. The porous section is diametrically expandable to a larger diameter than the imperforate section, preferably by relaxing after it has been inserted through the bottle neck.

Generally speaking, the porous section relaxes to a diameter in the range of 1.1 to 5 times the diameter of the imperforate section, preferably in the range of 1.5 to 3 times the diameter of the imperforate section. The porous section has a length as measured along the longitudinal axis that is in the range of 1 to 10 times the length of the nonporous section, preferably in the range of 2 to 6 times of the length of the nonporous section.

The imperforate section of the insert is generally tubular and defines a radially outward extending annular flange 28. The outside diameter of the imperforate section is preferably determined by the inside diameter of the neck of the bottle in which it is used, for a snug fit.

In the illustrated embodiment, the porous section comprises a multiplicity of ribs 30 extending generally alongside each other. The lateral flow paths are defined between the ribs. Generally speaking, the lateral flow paths prevent passage of particles, for example, fruit or vegetable chunks, that are greater than minimum cross-section size of ¼ inch. If desired, the lateral flow paths can prevent passage of particles of greater than a minimum cross section size of 1/40 inch, for example, tea leaves or coarse spices. The insert is preferably molded in its desired end form from a plastic that will permit the bulbous end to be temporarily collapsed and slid through the neck of the bottle. In the illustrated embodiment, the porous section expands to a generally prolate spheroid (football) or cylindrical spheroid (generally cylindrical with hemispherical end caps) shape.

Preferably and as illustrated, the ribs each have a longitudinally extending component. More preferably, the ribs extend generally longitudinally. However, if needed, cross ribbing could be provided, or collapsible or expandable rings place interiorly of the ribs. Also, for some applications, it may be necessary to mechanically expand the porous section, such as with a balloon that is later removed.

If desired, the insert can include a netting or screen 32 supported by the ribs. In one embodiment, the netting or screen has a mesh size of less than 20 mesh.

The insert is preferably used in combination with a bottle 34. The bottle has a neck 36 and a main body 38. The neck terminates in an annular sealing surface 40. The neck has an inside surface contacting an outside surface of the imperforate section of the insert. The sealing surface of the neck sealingly contacts the radially outwardly extending annular flange of the insert.

The porous section of the insert is inside of the main body of the bottle and the porous section is expanded to a larger diameter than the imperforate section. An annular volume 42, 142 is defined between the porous section of the insert and the main body of the bottle.

A mixture of plant matter and beverage is in the volume. The plant matter for example, can comprise fruit chunks 44, or crushed fruit, vegetable chunks 46, or pureed vegetables, a herb 48, a spice 50, or whole fruit 52. The porous section of the insert contains a filtrate 54 of the mixture without substantial solid plant matter.

Figure 4:
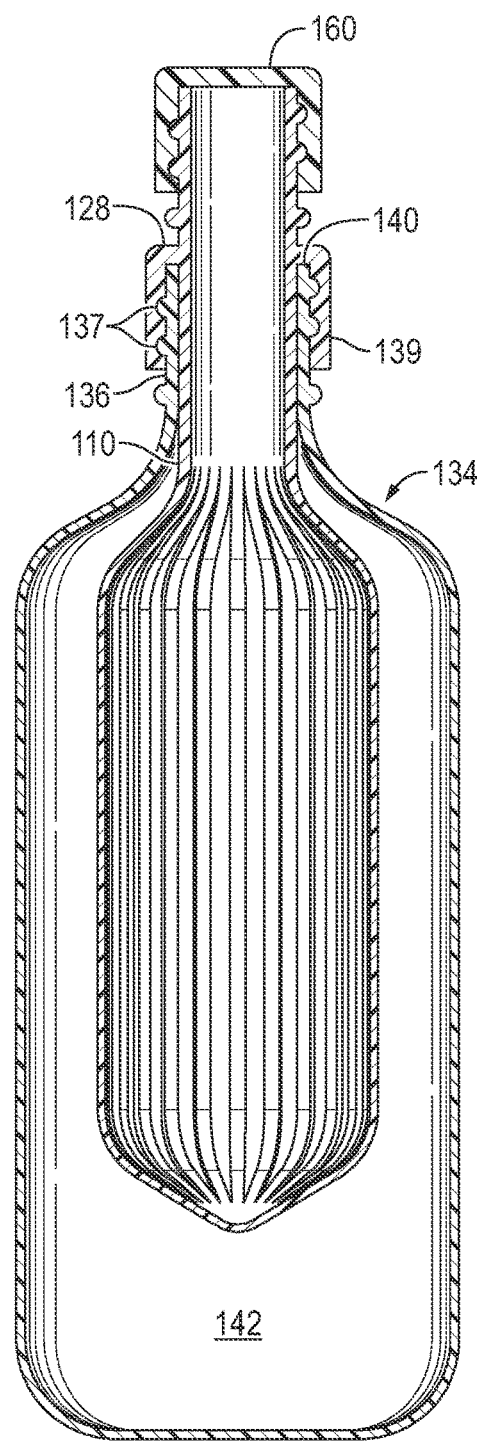
FIG. 4 is a cross-sectional view of another embodiment of the invention in a completed state.

In the embodiment of the invention shown in FIG. 4, the neck 136 of the bottle 134 is externally threaded at 137 and a threaded collar 139 depends from the radially extending annular flange 128 of the insert. The collar 139 engages the externally threaded neck of the bottle to urge the radially extending flange of the insert against the annular sealing surface 140 of the bottle. The neck is sealed by cap 160.

Figure 3:
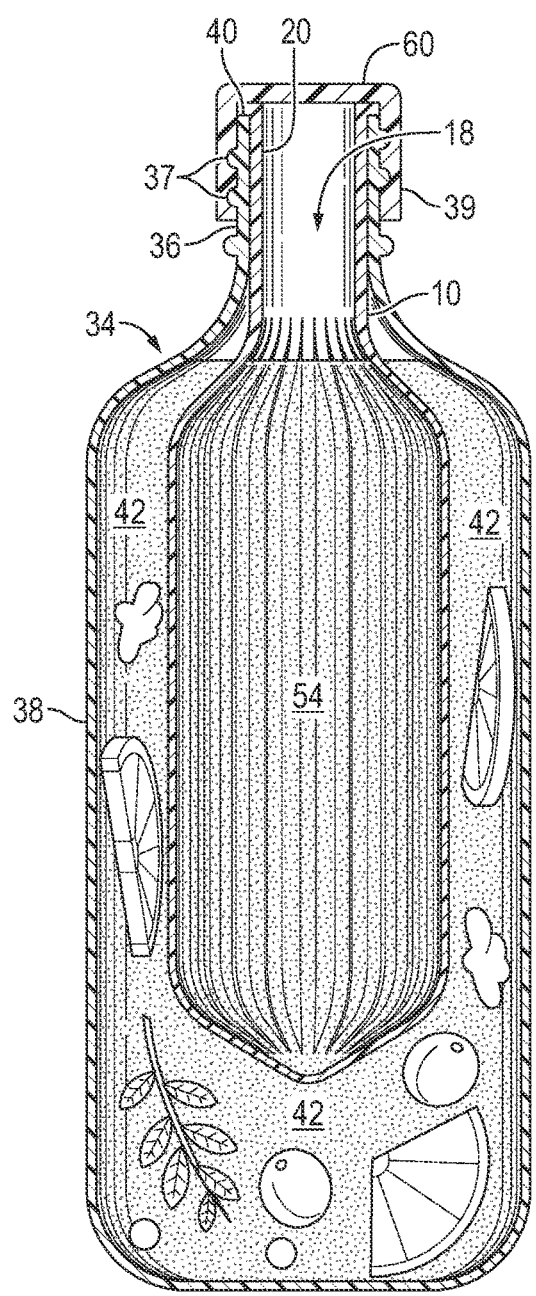
FIG. 3 is a cross-sectional view of the embodiment of the invention shown in FIG. 1 in a completed state.

In the embodiment of the invention shown in FIG. 3, the neck 36 of the bottle is externally threaded at 37. A cap 60 for the bottle is provided having a depending collar 39 with internal threads engaging the external threads on the bottle and urging the radially extending flange of the insert against the annular sealing surface 40 of the bottle.

A preferred embodiment of the invention provides a bottle assembly comprising a plastic bottle, an insert, a mixture of beverage and plant matter, and a solution of beverage and plant matter extracts.

The bottle is preferably made from thin-walled plastic, preferably transparent plastic. More preferably, the bottle is constructed to be disposable or for single-use. The bottle is preferably sized to have a volume in the range of 0.4 L to 0.8 L, and for this size bottle, PET will provide good results. For larger sized bottle, polycarbonate is expected to provide better results. In preferred embodiments, the plastic bottle has a volume in the range of 0.4 L to 0.7 L or in the range of 0.5 L to 0.7 L. The bottle defines a neck and a main body. The neck has an inside diameter generally in the range of 20 to 35 mm which terminates in an annular sealing surface. The main body of the bottle has a larger inside diameter than the neck.

The insert extends into the bottle. The insert has a tubular imperforate section positioned in the neck of the bottle and a porous section positioned in the main body of the bottle. Preferably, the imperforate section fits tightly in the neck and in one embodiment is not non-destructively removable. In the illustrated embodiment, the porosity is provided by longitudinally extending slits, but it could alternatively be provided by apertures, or made more effective for filtration by a screen or mesh covering. The insert defines an annular flange on an exterior of the imperforate section sealingly positioned against the annular sealing surface of the bottle. A chamber of annular cross section is defined between the porous section of the insert and the main body of the bottle. A mixture of beverage and plant matter is in the chamber, and a solution of beverage and plant matter extracts from the plant matter is in the insert. The insert has an open upper end in flow communication with the solution of beverage and extracts in the insert for consumption by users. For sale and long-term stability, the assembly further comprises a cap forming a seal against the open end of the insert.

Another embodiment of the invention provides a method for preparing a a plant matter flavored beverage for later consumption. The method comprises inserting plant matter into a bottle through the neck of the bottle, inserting a generally tubular strainer into the bottle which has a flange that sealingly abuts against the neck of the bottle. An annulus is formed between the insert and the wall of the bottle that contains the plant matter. The bottle is filled with a water-based liquid capped for transportation and later consumption. The strainer substantially isolates chunks of plant matter, which can be selected from a fruit portion, a vegetable portion, a herb portion, and a spice portion from the inside of the strainer.

In one embodiment, the invention can be described as an elongated insert for a bottle, said insert being composed of a strainer portion and a tubing portion. The strainer portion corresponds to the porous section previously described and the tubing portion corresponding to the imperforate section. An annular flange is defined by the tubing portion at a location spaced apart from the strainer portion. Where the tubing portion has an outside diameter, the annular flange is spaced from the strainer portion at a distance in the range of 1 to 10 outside diameters of the tubing portion, usually 2 to 6 outside diameters. The annular flange has a flat sealing face that faces the strainer portion. In use, the sealing face sealingly contacts the end of the bottle. The annular flange has an outside diameter which is approximately the same as the outside diameter of the neck of the bottle. With respect the outside diameter of the tubing portion, the annular flange generally has a diameter ranging from 0.5 to 5 mm greater than the outside diameter of the tubing portion, usually from 0.8 to 3 mm greater than the outside diameter of the tubing portion. The flat annular sealing surface of the annular flange is preferably in the range of 1-2 mm in width. The annular flange is preferably positioned at the end of tubing portion away from the strainer portion in one embodiment of the invention.

While certain preferred embodiments have been described herein, the invention is not to be construed as being so limited, except to the extent that such limitations are found in the claims.

What is claimed is:

1. A strainer insert for a bottle comprising:
   an elongated hollow tubular member having:
   an axially directed closed end adjacent a normally expanded porous section establishing a multiplicity of lateral fluid flow paths into the interior of the hollow tubular member;
   an axially directed open end adjacent an imperforate section of reduced diameter relative to the diameter of the normally expanded porous section; and
   an annular flange extending radially outwardly from the axially directed open end defining a flat annular sealing surface;
   wherein the normally expanded porous section is resiliently compressible to a compressed state having a diameter about the same as the diameter of the imperforate section.

2. The strainer insert for a bottle as in claim 1 wherein the normally expanded porous section has a diameter in the range of 1.1 to 5 times the diameter of the imperforate section.

3. The strainer insert for a bottle as in claim 1 wherein the normally expanded porous section and the imperforate section each has a length as measured along the longitudinal axis and the normally expanded porous section has a length that is in the range of 1 to 10 times the length of the imperforate section.

4. The strainer insert for a bottle as in claim 1 wherein the annular flange extending radially outwardly has an outer diameter that is 0.8 to 3 millimeters greater than the outside diameter of the imperforate section.

5. The strainer insert for a bottle as in claim 1 wherein the normally expanded porous section comprises a multiplicity of ribs extending generally alongside each other, the lateral flow paths being defined between the ribs.

6. The strainer insert for a bottle as in claim 1 wherein the annular flange extending radially outwardly has an outer diameter that permits a cap to be placed on an open end of a bottle with the strainer insert in place.

7. The strainer insert for a bottle as in claim 1 further comprises a netting or screen disposed within the normally expanded porous section.

8. The strainer insert for a bottle as in claim 1 wherein the elongated hollow tubular member is dimensioned to fit within a 0.5 liter or 16.9 fluid ounce bottle and/or having a neck inner diameter of about 0.85 inches or 21.6 millimeters.

9. The strainer insert for a bottle as in claim 1 wherein the elongated hollow tubular member is dimensioned to fit within a 591 milliliter liter or 20 fluid ounce bottle and/or having a neck inner diameter of about 1.28 inches or 32.5 millimeters.

10. The strainer insert for a bottle as in claim 1 wherein the annular flange extending radially outwardly generally has a diameter ranging from 0.5 to 5 millimeters greater than the outside diameter of the imperforate section.

11. The strainer insert for a bottle as in claim 10 wherein the annular flange extending radially outwardly generally has a diameter ranging from 0.8 to 3 millimeters greater than the outside diameter of the imperforate section.

12. The strainer insert for a bottle as in claim 1 wherein the flat annular sealing surface of the annular flange extending radially outwardly ranges from 1-2 millimeters in width.

* * * * *